US009292681B2

(12) United States Patent
Enache

(10) Patent No.: US 9,292,681 B2
(45) Date of Patent: Mar. 22, 2016

(54) PASSWORD AUDIT SYSTEM

(71) Applicant: PRAETORS AG, Beckenried (CH)

(72) Inventor: Costin Enache, Ludwigsburg (DE)

(73) Assignee: PRAETORS AG, Beckenried (CH)

( * ) Notice: Subject to any disclaimer, the term of this patent is extended or adjusted under 35 U.S.C. 154(b) by 0 days.

(21) Appl. No.: 14/178,706

(22) Filed: Feb. 12, 2014

(65) Prior Publication Data

US 2014/0237566 A1   Aug. 21, 2014

(30) Foreign Application Priority Data

Feb. 15, 2013   (EP) ..................................... 13155372

(51) Int. Cl.
*G06F 21/46* (2013.01)
*H04L 9/32* (2006.01)

(52) U.S. Cl.
CPC .............. *G06F 21/46* (2013.01); *H04L 9/3226* (2013.01)

(58) Field of Classification Search
CPC .............................. G06F 21/46; H04L 9/3226
See application file for complete search history.

(56) References Cited

U.S. PATENT DOCUMENTS

| 7,787,629 | B1 | 8/2010 | Belenko | |
|---|---|---|---|---|
| 7,929,707 | B1 | 4/2011 | Belenko | |
| 2004/0025031 | A1* | 2/2004 | Ooi et al. | 713/186 |
| 2004/0073815 | A1* | 4/2004 | Sanai et al. | 713/202 |
| 2004/0177272 | A1* | 9/2004 | Walters | G06F 21/46 |
| | | | | 713/183 |
| 2005/0198537 | A1 | 9/2005 | Rojewski | |
| 2008/0052525 | A1* | 2/2008 | Botchek | 713/184 |
| 2009/0150677 | A1* | 6/2009 | Vedula et al. | 713/183 |
| 2013/0138994 | A1* | 5/2013 | Notohardjono et al. | 714/2 |
| 2013/0212401 | A1* | 8/2013 | Lin | 713/183 |
| 2013/0269010 | A1* | 10/2013 | Wheeler | G06F 21/46 |
| | | | | 726/6 |

OTHER PUBLICATIONS

Kelley et al., "Guess again (and again and again): Measuring password strength by simulating password-cracking algorithms", 2012, pp. 523-537.*

* cited by examiner

*Primary Examiner* — Shawnchoy Rahman
*Assistant Examiner* — Thaddeus Plecha
(74) *Attorney, Agent, or Firm* — Lipsitz & McAllister, LLC

(57) ABSTRACT

A password audit system is provided for determining the strength of user passwords in a computer system, application or network to which users have access via a user identification and password. The password audit system may include: an interface for establishing a data connection between the password audit system and the computer system, application or network, configured to retrieve cipher text user passwords stored thereon; a central processing unit, configured to successively generate different plain text passwords, encode them into corresponding cipher text passwords, and compare the encoded cipher text passwords to a given one of the retrieved cipher text passwords, until a match is found or a predetermined time has elapsed; and data storage means for storing data relating to the strength of the user passwords, the strength being dependent on the employed method to generate the different plain text passwords and/or the time needed to find a match.

19 Claims, 2 Drawing Sheets

PASSWORD AUDIT SYSTEM

This application claims the benefit of European patent application No. 13 155 372.9 filed on Feb. 15, 2013, which is incorporated herein by reference in its entirety and for all purposes.

The present invention relates to a password audit system for determining the strength of user passwords in a computer system, application or network to which a plurality of users have access via a user identification and password.

BACKGROUND OF THE INVENTION

Passwords are the most widely used authentication mechanism in computer environments. In the computer systems, applications and networks mentioned above, passwords are used to protect the identity of the users and to enable authenticated access to resources and data. For authentication of the users, their password data have to be stored within the protected environment, so that it can be verified if it matches the password entered by the user when accessing the system. All such protected systems typically have system administrators, which are privileged users and can access data without being limited as the normal users are. Technically, the administrators are able to extract and see the other users' password data.

In order to prevent the exposure of passwords, computer systems usually implement password encryption (also called password hashing). This operation transforms the actual user password (called the plain text password) into encoded data (called the cipher text password). The cipher text can be used to verify whether the entered password is correct, but it cannot be used to determine the plain text, because the employed encryption algorithm is an irreversible mathematical operation. When the user enters the password, the plain text is encoded and compared to the stored cipher text—if it matches, the password is correct.

In a typical computer security compromise, the cipher text data becomes exposed and the attacker tries to determine the plain text from the cipher text, in order to find the actual passwords. As the mathematical operation of encoding is irreversible, the attacker has to try different plain texts, encode them, and find one which matches the cipher text. Various strategies are employed: brute force (where all the letter, number and special character combinations are tried), dictionary (where all the words in a list are tried) and several combinations based on the above. This process is commonly called "password recovery".

In order to make this process take a very long time, the mathematical operations used for encoding employ complex encryption and hashing algorithms. The aim of this design is to protect the passwords by making the password recovery process take too much time to be effective in recovering the plain text password data.

Over the past years, the computers have become more and more powerful, being able to execute the encryption operations much faster. The encryption algorithms have also been upgraded to be harder to recover. The result of this process is that currently passwords are relatively easy to recover if the password complexity is low, and hard to impossible if the password complexity is high. Companies and organizations typically define password policies, which specify how complex the passwords have to be which are used in their computer system, application or network.

Various factors can lead to the exposure of plain text passwords, such as using the same initialization password in a given company when setting up new accounts, using predictable or easy to remember passwords, using the same password in multiple systems, etc. Companies and organizations typically enforce their password policies in order to prevent such exposure. However, these policies cannot be made too strict, because then the users will start forgetting their passwords. An ideal system would enforce strong passwords, which are complex enough but possible to memorize, each user being able to choose: e.g., one will use a shorter but completely random password, while another will use a very long but relatively easy to remember password; both would be sufficiently strong.

The large number of successful attacks targeting passwords in the last years indicates that the current technology, or the way it is employed, does not succeed in preventing the usage of weak, predictable passwords.

There are basically two possibilities for the owner or administrator, respectively, of a computer system, application or network to make sure that the users in the given company or organization use strong passwords: firstly by enforcing a strong password policy when the password is changed, and secondly by actively checking the stored cipher text passwords to identify weak, predictable passwords. The first method provides the most basic protection, but very often it is not effective, as the users will try to use easy to memorize passwords, even with a strong policy. The second method could compensate the weaknesses of the first one, by actively simulating a real attack and thus detecting any weak or predictable passwords of the users. However, this method often cannot be employed due to legal restrictions, because it reveals the plain text passwords to the system administrator, or at least makes such a revelation possible. This is considered as contravening data privacy protection, and is therefore illegal in most countries.

It is the object underlying the invention to provide a system which allows to determine the strength of user passwords and to provide this information to the administrator of the computer system, application or network, without revealing the passwords themselves to the administrator or any other person.

SUMMARY OF THE INVENTION

According to the present invention, this problem is solved by a password audit system as mentioned at the beginning, the password audit system comprising:
  an interface for establishing a data connection between the password audit system and the computer system, application or network, being configured to retrieve the cipher text user passwords stored on the computer system, application or network;
  a central processing unit, being configured to successively generate different plain text passwords, encode them into corresponding cipher text passwords with an encryption algorithm, and compare the encoded cipher text passwords to a given one of the retrieved cipher text passwords, until a match is found or a predetermined time has elapsed; and
  data storage means for storing data relating to the strength of each of the user passwords, the strength being dependent on the employed method to generate the different plain text passwords and/or the time needed to find a match,
wherein the components of the password audit system are enclosed in a housing which is separate from the computer system, application or network.

The inventive password audit system is a separate physical entity, which retrieves the cipher text data from the system to be audited, performs a password recovery process as it is generally known from the art, and stores only the relevant information relating to the strength of the passwords, so that this information can be provided to and evaluated by the administrator or owner, respectively, of the computer system. However, the user passwords are not compromised, because the recovered plain text passwords are not accessible at any time.

To ensure privacy protection by the password audit system, it is most preferred if the system is configured such that a plain text password for which a match has been found is not stored in the data storage means, or only stored in a way that it is not assignable to the corresponding user identification. In the first case, the plain text password is discarded instantly after it has been identified and the data relating to its strength has been stored, so that any access to the plain text itself is impossible. In the second case, the plain text password is stored, but not in a personalized way, e.g., by adding it to a dictionary used for the password recovery process, to make this process more effective for future audits.

In a preferred embodiment, the system is configured to generate a list comprising the user identifications and assigned values relating to the strength of the user passwords. This list can be generated from the stored data relating to the strength of the passwords, after completion of the password recovery process or at any later point in time. The values assigned to each user identification may be binary in the most simple case, i.e., the value is "weak" if a match has been found by the password recovery process within the predetermined time, and otherwise the value is "strong". In addition, the value can be on a numerical scale, wherein weak passwords are further classified depending on how fast a match was found.

It is to be noted that the value relating to the strength of a password is dependent on the predetermined time which is given for the password recovery process. It is preferred if the length of this time can be varied by the system administrator, depending on the aspired level of password security in the company or organization.

The value relating to the strength of the user passwords may also takes into account a given password policy of the computer system, application or network. Such a policy can prescribe, e.g., that a password should have a minimum length, consist of different types of characters (letters, numbers etc.), or be not a known word from a dictionary. The inventive system can analyse the recovered passwords in view of this policy, and assign a value indicating a weaker password if one or more provisions are not met. Alternatively or in addition, the list can also include an explicit information about which of the provisions are not met by the password.

The interface of the inventive system is preferably configured to provide the generated list to the computer system, application or network via the data connection. There, it can be accessed by the system administrator, and brought into any desired format. Based on this information, the administrator or another authorised person on behalf of the company or organization can take pre-emptive measures to increase password security, in particular by informing the users with weak passwords, and asking them to change their password in accordance with the password policy.

In another embodiment of the invention, the system is configured to generate an electronic message to the corresponding user if the strength of his password is insufficient, i.e., if it has been recovered within the predetermined time. The message may be an e-mail or a system information upon the user's next login. Such an automatic notification of the users ensures that weak passwords are replaced as soon as possible, and it also facilitates the process for the system administrator, in particular in large systems with many users.

The interface is preferably capable of retrieving data from different software platforms running on the computer system, application or network. This means that the inventive system can be universally employed in connection with different platforms such as Microsoft Windows, Apple Mac OS X or UNIX.

Furthermore, the central processing unit of the inventive system is ideally capable of using different encryption algorithms being stored in the data storage means, depending on the encryption algorithm used by the computer system, application or network. In order to ensure compatibility with all commonly used systems, the corresponding encryption algorithms of all these systems should be stored, wherein the applicable algorithm is selected automatically or manually upon setup of the inventive system.

For the password recovery process, the central processing unit may employ any known methods to generate the different plain text passwords. In particular, they are generated by means of one or more dictionaries stored in the data storage means, and/or by a random combination of characters (brute force). A common approach is to try the words of the dictionary first, then a number of modifications of the dictionary words, and finally the brute force method. The predetermined time, which is given for the attempt to recover each user password, is generally sufficient to try all dictionary words and their modifications, and to start the brute force method if the first two methods were not successful. If the matching password has been found in a dictionary, this information can also be included in the result list and provided to the respective user, so that he knows the reason why his password is weak.

As already mentioned above, the inventive system may be configured to include plain text passwords, for which a match has been found, into a dictionary. By this method, relatively weak passwords that have been recovered by the brute force method will be recovered even faster in the next audit and will be identified as even weaker, in case that the same or another user again uses this password. It has to be ensured, however, that the passwords added into the dictionary are not assigned to specific users, and that they cannot be accessed from outside the inventive system.

In order to increase the computing power of the inventive system for generating the different plain text passwords and encoding them into cipher text passwords, it is preferred if the system further comprises a co-processor to support the functions of the central processing unit. In particular, graphics processing units (GPU) can be advantageously used as co-processors, as they are very powerful in password recovery.

In another preferred embodiment of the invention, the password audit system further comprises one or more sensors to detect physical impacts on the housing, such as vibration, tilting or shock. As the housing is not intended to be opened during the normal setup and operation of the inventive system, any attempt to open it can be considered as an unauthorized intervention, against which protective measures should be taken.

Preferably, the inventive system can be configured (after it has been positioned and connected to the computer system) to shut down and prevent any access to the stored data if a physical impact on the housing is detected. Most preferably, the stored data is deleted in such an event, which provides the highest level of protection against any attempt to access password data stored by the system.

Similarly, the inventive system can also be configured to shut down and prevent any access to the stored data if an unauthorized access via the interface is detected. That is, the password audit system also protects itself against logical attacks via the computer system, application or network.

BRIEF DESCRIPTION OF THE DRAWINGS

These and further advantages of the invention will be explained in connection with the following preferred embodiments, making reference to the figures.

The figures show.

DETAILED DESCRIPTION OF THE INVENTION

Figure 1:
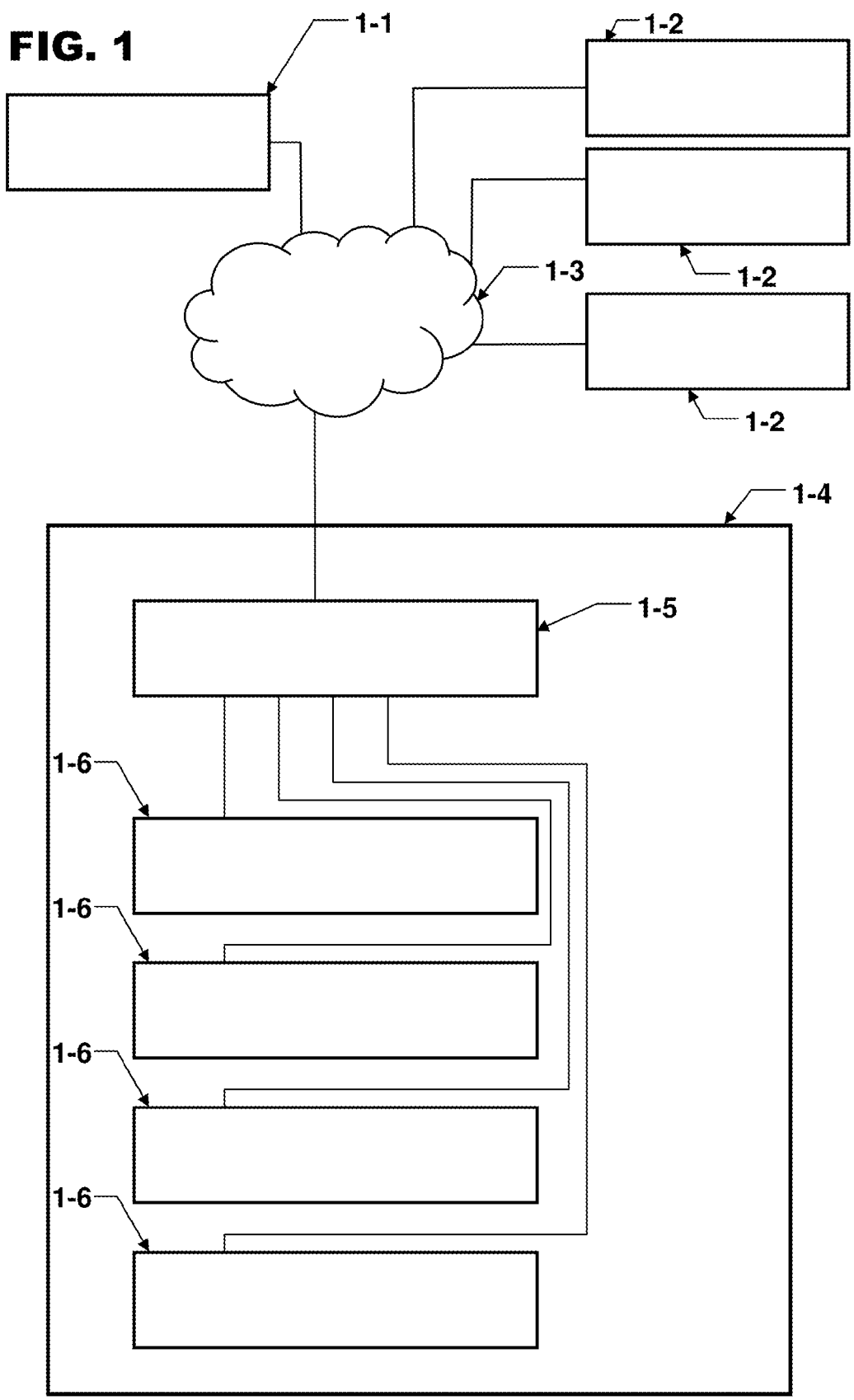
FIG. 1: a schematic illustration of the deployment of an inventive password audit system in a cluster configuration.

The inventive password audit system can be deployment in a cluster configuration within a typical client network, where the operators of the password audit system and of the audit target reside. An exemplary configuration of such a cluster is schematically shown in FIG. 1.

In this configuration, an operator console 1-1 is connected via an audit network 1-3 to several targets 1-2 for the password audit, i.e., computers systems, applications or networks. Also connected via the audit network 1-3 are multiple instances of the inventive password audit system 1-4, comprising one master/controller unit 1-5 and several slave units 1-6, which cooperate in performing the operations described below. This configuration allows for a scaling of the inventive system 1-4, wherein the multiple instances 1-5 and 1-6 perform simultaneous operations in auditing one or more of the targets 1-2.

Figure 2:
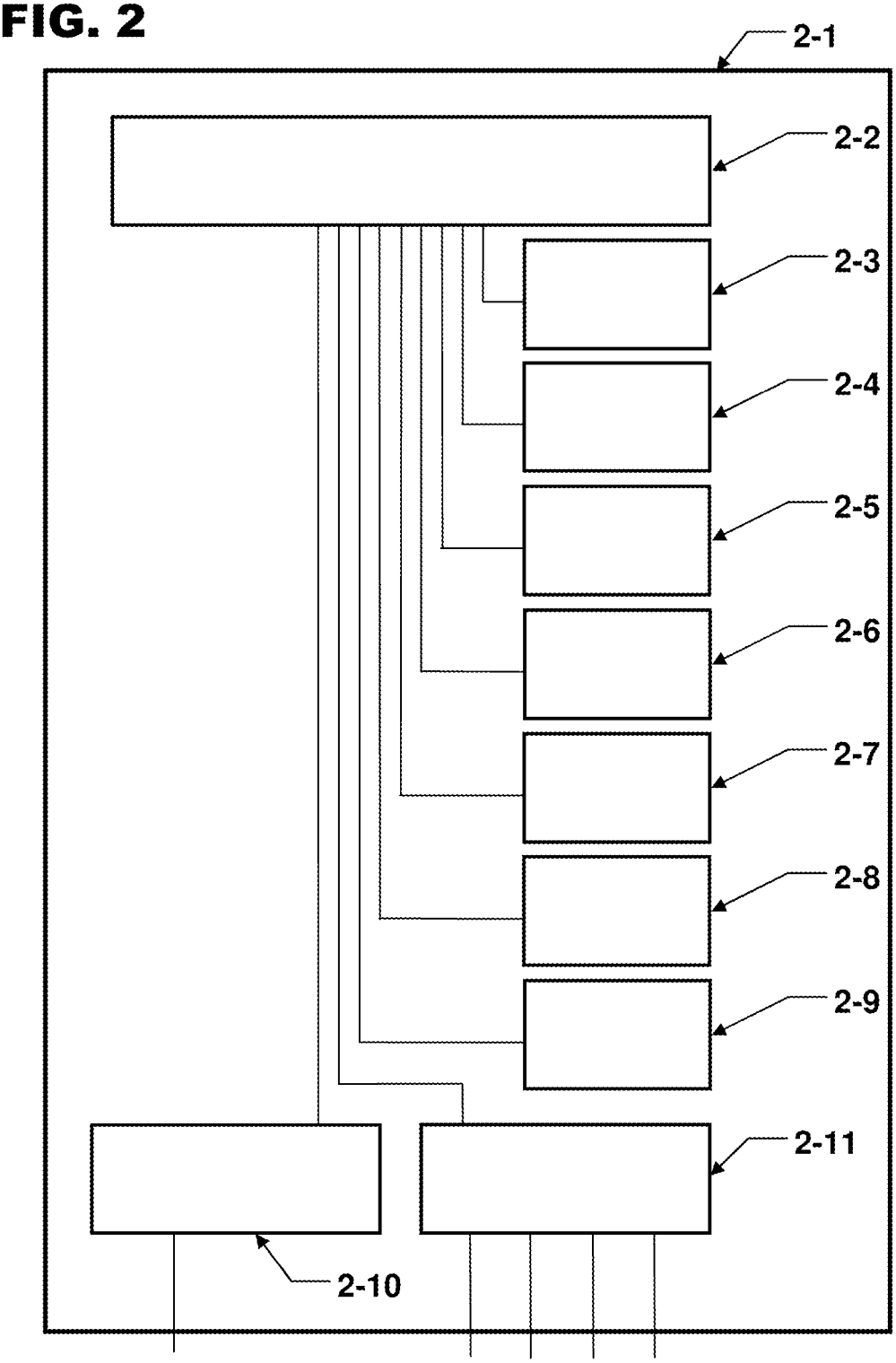
FIG. 2: a schematic illustration of the components of an inventive password audit system.

A schematic illustration of an inventive password audit system or an instance thereof, respectively, is shown in FIG. 2 as an exemplary embodiment. This system comprises a housing 2-1, which encloses the following components: a central processing unit 2-2, a co-processor 2-3 which is a graphics processing unit (GPU) as an encryption accelerator, a physical impact sensor 2-4, a housing intrusion sensor 2-5, a trusted platform module (TPM) 2-6, hard disks as data storage means comprising an encrypted storage 2-7, an unencrypted storage 2-8 and an upgrade module, as well as an interface for establishing a data connection to a computer system, application or network and an interface for establishing a data connection to an audit network according to FIG. 1.

The inventive system is a separate entity from the computer system, application or network to be audited. Any attempt to open or access the housing 2-1 during operation of the system will be detected by the sensors 2-4 and 2-5, leading to a shut-down of the system and prevention of any access to the stored data. In addition, the password audit system stores all the application and user data, including operational and customization information, only in an encrypted format, which provides further protection against any revelation of sensible data, in particular of password data.

The operations which are performed by the inventive system, according to the embodiment described herein, can be summarized as follows:

At start-up, the system first employs TPM functions in order to make sure that the software and hardware environment has not been tampered with while the system was not turned on; if tampering has been detected, the system will not start;

after the tampering test has been passed successfully, the system retrieves from the TPM the first half of the encryption key (hardware key) used for the data storage protection and prompts the operator for the second half;

after the operator provides the second half of the key (user key), it is combined with the hardware key and the result is used to decrypt the storage and start the operating system and the application software; the system is now operational;

the system starts applications which monitor the environment: logical attacks and hardware intrusion are monitored, and if detected, the event is logged and the system is shut down;

the system operator can now authenticate and use the system functionality: after the system has been initialized, the operator can define targets for the password audit; the system will store the information and, at the scheduled time, will perform the audit operation, will then generate a report, and inform the operator or other defined users;

the system operator first defines a new target for password audit, by specifying the network address, the type of system, the cipher text password retrieval method; the information is verified and the target saved;

the system operator then defines a new audit operation, by specifying the target, the audit details, such as what dictionaries are to be used, if GPU acceleration is to be employed, how long the predetermined time for finding a match should be, and what the password policy is; the operator also specifies when the audit will take place and if it is repeated on a regular basis, who should be informed about the results, and if the users affected by weak passwords should be automatically informed; the audit process information is saved;

at the scheduled time, the system will start the audit operation by retrieving the cipher text passwords from the target, start the password recovery process as defined by the operator parameters, and wait for its completion; any weak passwords detected will be assessed, by determining why the password was found and why the password is weak (e.g., the password is too short or present in a dictionary); the data relating to the strength of the password is saved together with the user identification, whereas the plain text password itself will not be saved in connection with the user;

after completion of the audit process, the system generates a report with the results, including a list with the affected user identifications and a value relating to the strength of the detected passwords; the report is sent or made available to the system operator; optionally, if chosen, the affected users are informed automatically by e-mail;

after generation of the report, all the retrieved cipher text passwords are destroyed; the report remains in storage;

multiple targets and audit operations can be defined on the same password audit system; the targets can be different, corresponding to computer systems, applications and networks from various different vendors, including custom applications.

LIST OF REFERENCE NUMERALS

1-1 operator console
1-2 targets (computer systems, applications or networks)
1-3 audit network
1-4 password audit system
1-5 master/controller unit
1-6 slave units
2-1 housing
2-2 central processing unit 2-3 co-processor (graphics processing unit)
2-4 physical impact sensor
2-5 housing intrusion sensor
2-6 trusted platform module (TPM)
2-7 encrypted storage (hard disk)
2-8 unencrypted storage (hard disk)
2-9 upgrade module (hard disk)
2-10 interface to computer system, application or network
2-11 interface to audit network

What is claimed is:

1. A password audit system for determining strength of user passwords in a computer system, application or network to which a plurality of users have access via a user identification and password, the password audit system comprising:
an interface for establishing a data connection between the password audit system and the computer system, application or network, the interface being configured to retrieve cipher text user passwords stored on the computer system, application or network;
a central processing unit, being configured to successively generate different plain text passwords by employing at least one of a method using one or more dictionaries and a method using random combinations of characters, encode the plain text passwords into corresponding cipher text passwords with an encryption algorithm, compare the encoded cipher text passwords to a given one of the retrieved cipher text passwords, until a match is found or a predetermined time has elapsed, and determine the strength of each of the user passwords based on the employed method used to generate the different plain text passwords and an amount of time needed to find the match; and
data storage means for storing data relating to the strength of each of the user passwords without storing the passwords themselves,
wherein the interface, the central processing unit, and the data storage means are enclosed in a housing which is separate from the computer system, application or network.

2. The password audit system of claim 1, wherein the central processing unit is configured to generate a list comprising the user identifications and assigned values relating to the strength of the user passwords.

3. The password audit system of claim 2, wherein the assigned values relating to the strength of the user passwords take into account a given password policy of the computer system, application or network.

4. The password audit system of claim 2, wherein the interface is configured to provide the generated list to the computer system, application or network via the data connection.

5. The password audit system of claim 1, wherein the central processing unit is configured to generate an electronic message to a corresponding user if the strength of the password is insufficient.

6. The password audit system of claim 1, wherein the interface is capable of retrieving data from different software platforms running on the computer system, application or network.

7. The password audit system of claim 1, wherein the central processing unit is capable of using different encryption algorithms stored in the data storage means, depending on a corresponding encryption algorithm used by the computer system, application or network.

8. The password audit system of claim 1, wherein the central processing unit is configured to include plain text passwords, for which the match has been found, into a dictionary.

9. The password audit system of claim 1, further comprising a co-processor to support functions of the central processing unit.

10. The password audit system of claim 9, wherein the co-processor is a graphics processing unit.

11. The password audit system of claim 1, further comprising one or more sensors to detect physical impacts on the housing, the physical impacts comprising at least one of vibration, tilting and shock.

12. The password audit system of claim 11, wherein the password audit system is configured to shut down and prevent any access to the stored data if a physical impact on the housing is detected.

13. The password audit system of claim 1, wherein the password audit system is configured to shut down and prevent any access to the stored data if an unauthorized access via the interface is detected.

14. A computerized method for determining strength of user passwords in a computer system, application or network to which a plurality of users have access via a user identification and password, the method comprising:
retrieving cipher text user passwords stored on the computer system, application or network via an interface connected to the computer system, application or network;
successively generating, by means of a central processing unit, different plain text passwords by employing at least one of a method using one or more dictionaries and a method using random combinations of characters, encoding the plain text passwords into corresponding cipher text passwords with an encryption algorithm, and comparing the encoded cipher text passwords to a given one of the retrieved cipher text passwords, until a match is found or a predetermined time has elapsed;
determining, by means of the central processing unit, the strength of each of the user passwords based on the employed method used to generate the different plain text passwords and an amount of time needed to find the match, and
storing, in data storage means, data relating to the strength of each of the user passwords without storing the passwords themselves,
wherein the interface, the central processing unit, and the data storage means are enclosed in a housing which is separate from the computer system, application, or network.

15. The computerized method of claim 14, further comprising generating a list comprising the user identifications and assigned values relating to the strength of the user passwords.

16. The computerized method of claim 15, wherein the assigned values relating to the strength of the user passwords take into account a given password policy of the computer system, application or network.

17. The computerized method of claim 15, further comprising providing the generated list to the computer system, application or network via the data connection.

18. The computerized method of claim 14, further comprising generating an electronic message to a corresponding user if the strength of the password is insufficient.

19. The computerized method of claim 14, further comprising including plain text passwords, for which the match has been found, into a dictionary.

* * * * *